United States Patent
Snider

[15] 3,688,919
[45] Sept. 5, 1972

[54] HAY BALE VEHICLE
[72] Inventor: George P. Snider, Brewster, Wash.
[73] Assignee: Hydraslip, Inc., Twisp, Wash.
[22] Filed: March 9, 1971
[21] Appl. No.: 122,309

[52] U.S. Cl....................214/6 B, 214/8.5 F, 214/522
[51] Int. Cl............................B65g 57/32, B65g 59/12
[58] Field of Search..........214/6 B, 6 G, 8.5 F, 8.5 R, 214/8.5 G, 520, 521, 522

[56] References Cited

UNITED STATES PATENTS

| 3,385,456 | 5/1968 | Snider | 214/6 B |
| 3,502,230 | 3/1970 | Grey et al | 214/6 B |
| 3,510,013 | 5/1970 | Best | 214/6 B |
| 3,515,292 | 6/1970 | Oborny | 214/520 X |

Primary Examiner—Robert J. Spar
Attorney—Wells, St. John & Roberts

[57] ABSTRACT

A hay bale vehicle is described having the capability of picking up hay bales from a field one at a time and stacking the hay bales on a bed. The vehicle further has the capability of unloading the stacked hay bales as a stack or unstacking the hay bales and discharging the bales one at a time from the vehicle.

4 Claims, 13 Drawing Figures

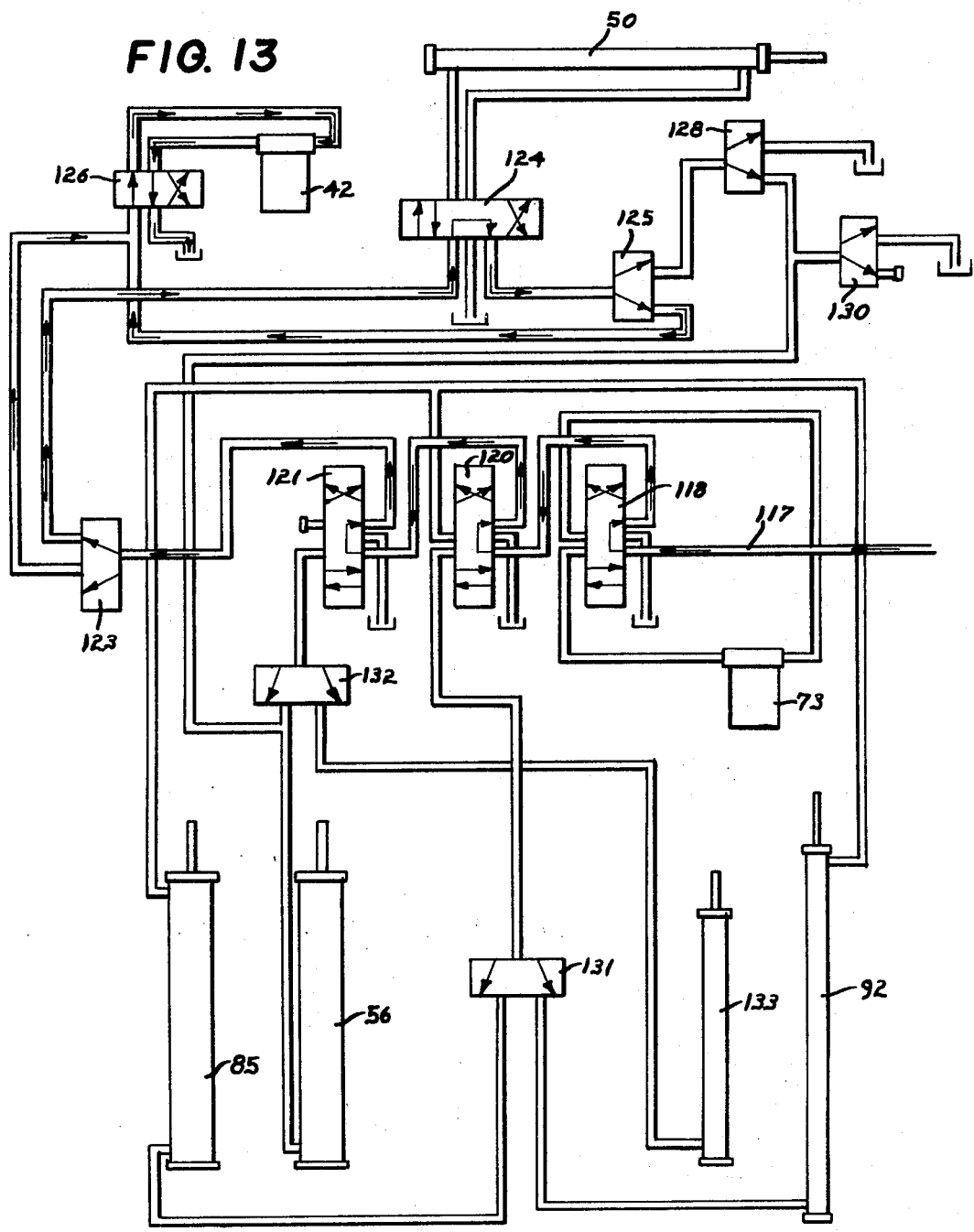

HAY BALE VEHICLE

BACKGROUND OF THE INVENTION

This invention relates to hay bale vehicles and more particularly to hay bale vehicles capable of unloading hay bales therefrom.

There has been a substantial need in the agricultural industry for a hay bale vehicle that had the capability of picking up hay bales from a field, and transporting the bales to a stacking station, and unloading the bales for storage. In years past, hay bales were normally loaded by hand onto a vehicle in the field and transported to a barn for manual unloading. It was not uncommon for the bales to be manually unloaded from the vehicle and placed on a conveyor near ground level that transported the bales upward to the top of the hay stack in the barn. Several vehicles have been developed for automatically picking up the bales from the field and forming the bales into a stack on the vehicle. Normally the vehicle is transferred to a barn, or storage area and the bales are either manually unloaded or the bales are mechanically discharged as a stack. An example of such a vehicle is disclosed in U. S. Pat. No. 3,385,456 issued on May 28, 1968. However, such a machine is incapable of automatically unloading the bales one at a time from the vehicle and discharging the bales onto a storage conveyor that transports the bales to the top of the hay stack.

One of the principal objects of this invention is to provide a hay bale vehicle capable of unloading a stack of hay bales and discharging the bales one at a time at a selected elevation for loading onto a hay stack conveyor.

An additional object of this invention is to provide a hay bale vehicle that has the capability of both picking up the bales from the field one at a time and forming a stack on the vehicle and the capability of unloading the stack from the vehicle and depositing the bales at a selected elevation for loading onto a hay stack conveyor or the like.

A further object of this invention is to provide a hay bale vehicle that may be powered and pulled by a conventional tractor that is readily available on most farms.

An additional object of this invention is to provide a hay bale vehicle that is relatively inexpensive to manufacture and which can be sold at a price that is within the financial means of most small farmers to enable small farmers to be more competitive.

These and other objects and advantages of this invention will become apparent upon the reading of the following detailed description of a preferred embodiment.

BRIEF DESCRIPTION OF THE DRAWINGS

A preferred embodiment of this invention is illustrated in the accompanying drawings, in which:

FIG. 13 is a schematic view of a hydraulic system utilized in controlling and operating the hay bale vehicle.

DETAILED DESCRIPTION OF A PREFERRED EMBODIMENT

Figure 1:
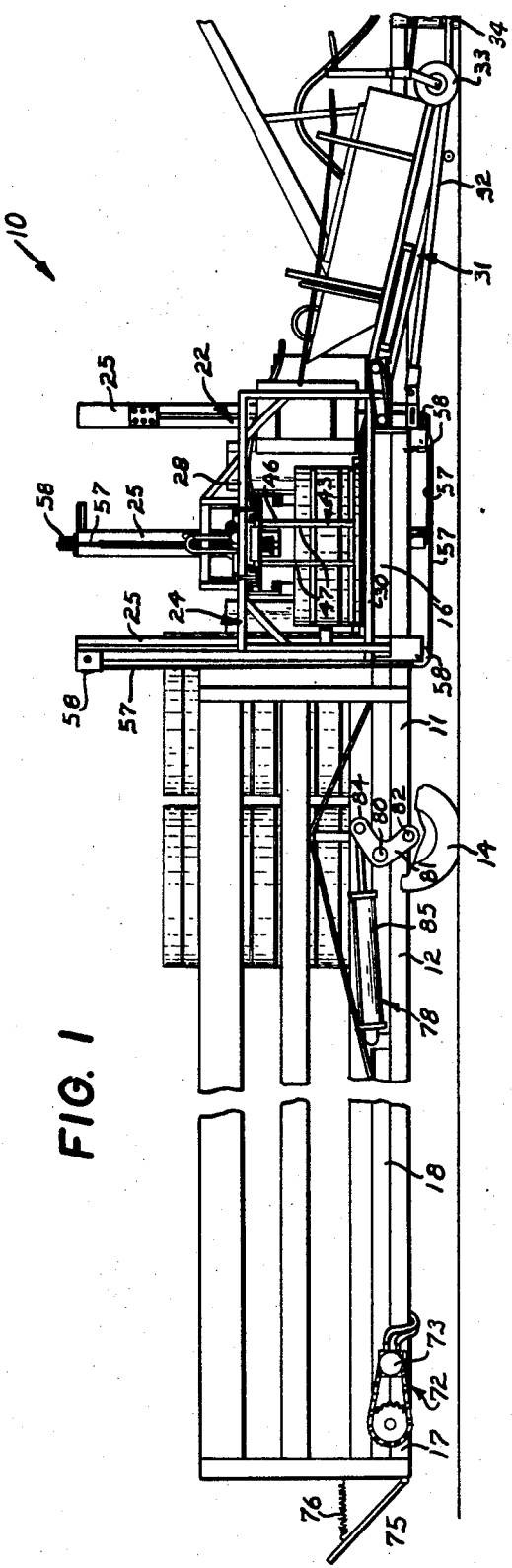
FIG. 1 is a side elevational view of a hay bale vehicle embodying the principle features of the invention.

Now referring to the drawings, there is shown in FIG. 1 a hay bale vehicle generally designated by the numeral 10 having a mobile frame 11 with a bed or platform 12 constructed thereon. The mobile frame 11 is supported by wheels 14. The bed 12 has a front end 16 and a rear end 17 with parallel transversely spaced sides 18 and 20. A hitching tongue 21 (FIG. 2) is affixed on the front end 16 to enable the vehicle to be pulled by a prime mover such as a conventional tractor. The vehicle 10 has a stacking and unstacking station 22 adjacent the front end 16. The vehicle also has an elevator mechanism 24 mounted on the frame 11 at the stacking and unstacking station 22. The elevator mechanism 24 has upright supports 25 that extend upward along both sides 18 and 20. The elevator mechanism has an elevator frame 28 that extends between sides 18 and 20 over the bed 12. The elevator frame 28 also extends outward from side 18. The elevator frame includes a platform 30 that is positioned along side the bed for movement vertically along the side 18 at the stacking and unstacking station 22. The frame 28 is slidably mounted on the uprights 25 for vertical movement.

Figure 2:
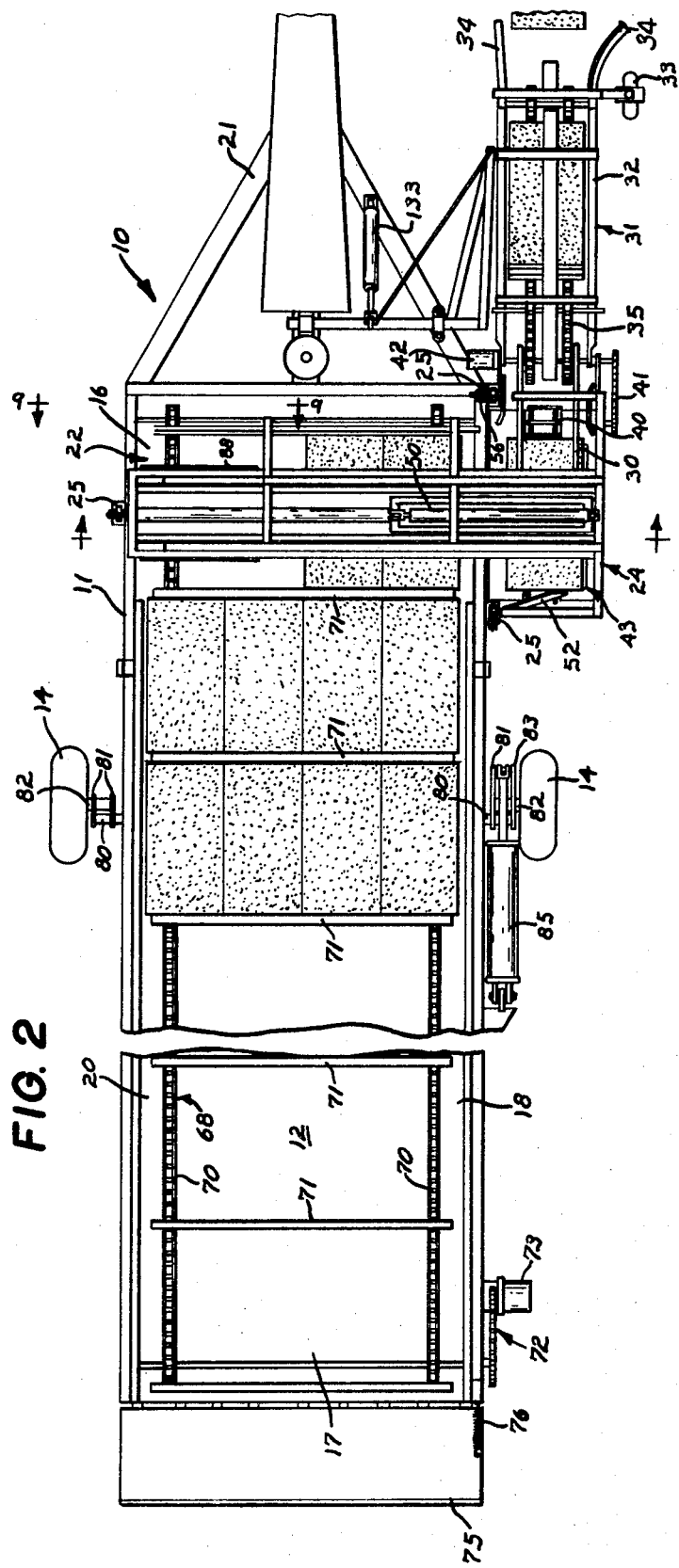
FIG. 2 is a planned view of the hay bale vehicle showing a pickup mechanism and an elevator mechanism for stacking the hay bales onto the vehicle.
Figure 3:
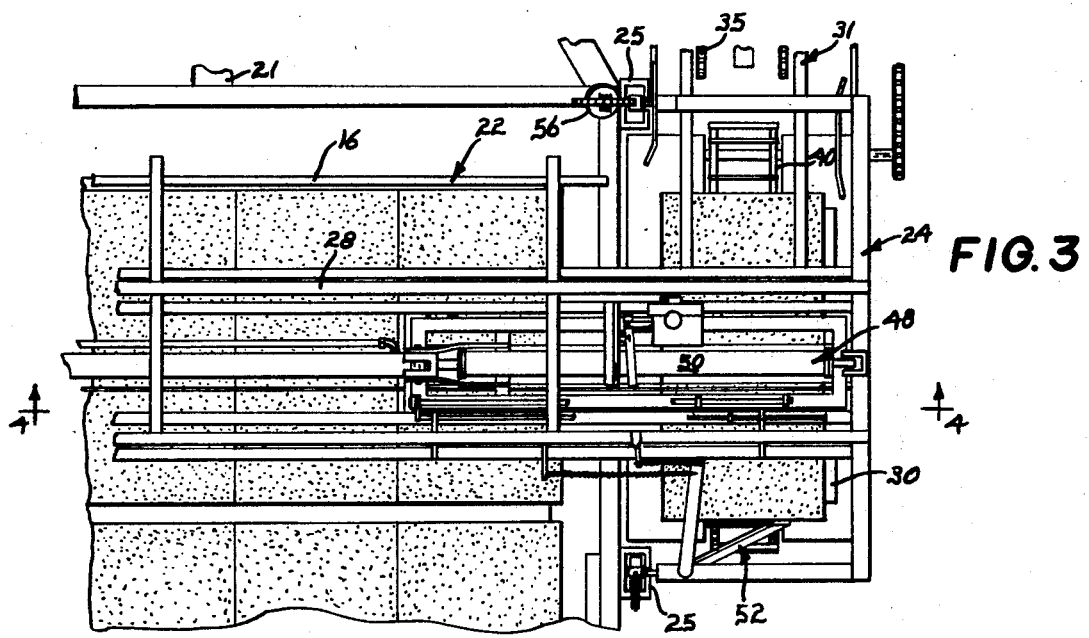
FIG. 3 is a fragmentary enlarged plan view of a section of the elevator mechanism and pickup mechanism illustrating the loading of hay bales onto the vehicle.

The hay bale vehicle has a bale pickup and discharge mechanism 31 that is mounted on the frame for picking up the bales from the field as the vehicle is pulled over the field. The bale pickup and discharge mechanism 31 has a boom structure 32 that is pivotally affixed to the mobile frame 11 and extends forward from the bed in longitudinal alignment with the platform 30. The front end of the boom is supported by a caster wheel 33. The boom 30 has entrance guides 34 for receiving and guiding the bales onto a conveyor 35 for movement to the platform 30. The conveyor 35 has a front end that is slidably mounted on the boom 33 and a rear end 37 that is pivotally mounted to the elevator frame 28 in longitudinal alignment with platform 30. The conveyor 35 has cleats on a continuous chain that picks the hay bales off the ground and propels the hay bales one at a time up the conveyor 35 and deposits the hay bales on the platform 30. A platform conveyor 40 (FIG. 2 and 3) is positioned on the elevator frame 28 for receiving the bales from the pickup conveyor 35 and moving the bales fully onto the platform 30 and into the stacking and unstacking station 22 with the bales aligned longitudinally to the bed. The platform conveyor 40 and pickup conveyor 35 are driven by common drive means 41 that includes a hydraulic motor 42 (FIG. 2).

Figure 4:
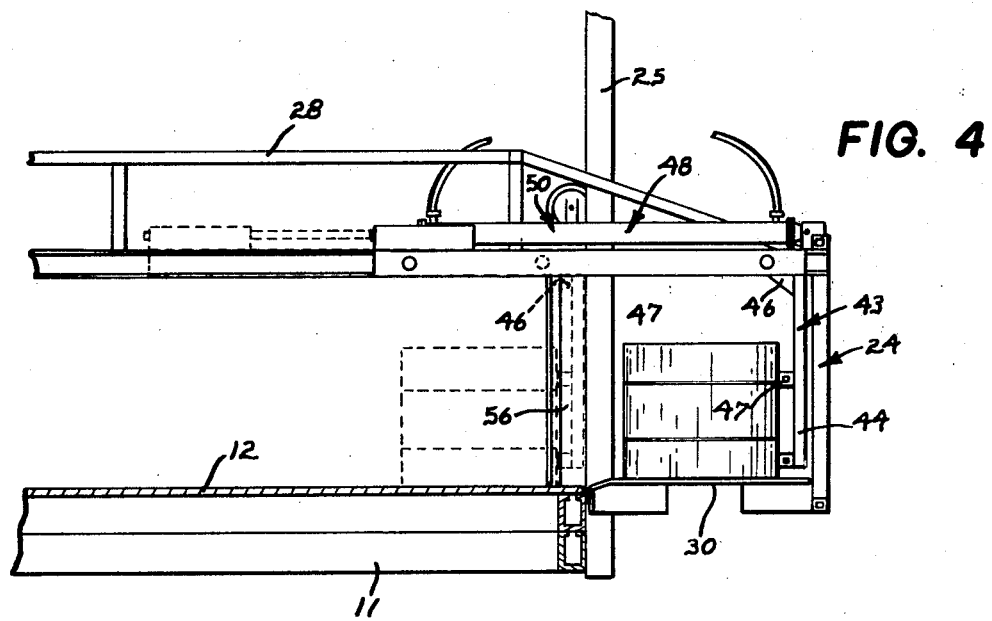
FIG. 4 is a vertical cross-sectional view taken along line 4—4 in FIG. 3.

A row formation mechanism 43 (FIGS. 4-7) is mounted on the elevator frame 28 for reciprocal movement to move the bales sidewards from the platform 30 onto the bed 12. The row formation mechanism 43 includes a transverse pusher 44 having a sliding frame 28 for transverse movement across the platform 30. The frame includes pusher arms 47 that extend downward from the overhead elevator frame 28. The row formation mechanism 43 has a drive means 48 for moving the frame 46 a sufficient distance to push a hay bale from the platform 40 onto the bed 12 as shown in FIG. 4. The drive 48 includes a hydraulic cylinder 50 that is mounted on the elevator frame 28 and is operatively connected to the pusher arms 47 for reciprocating the pusher arms back and forth over the platform 30.

A sensing means 52 (FIG. 2 and 3) is mounted on the elevator frame 28 for sensing the presence of a hay bale on the platform 30. A control means 53 (FIGS. 3, 5-7), is operatively connected between the sensing means 52 and the hydraulic cylinder 50 for operating the hydraulic cylinder when a hay bale is present on the platform to push the hay bale from the platform to push the hay bale from the platform onto the bed.

The elevator mechanism 24 has an elevator drive for raising and lowering the elevator frame to position the platform at several spaced vertical locations corresponding to layers of hay bales. The elevator drive includes a hydraulic cylinder 56 (FIG. 2 and 3) mounted on the mobile frame 11 and operatively connected to the elevator frame 28. The hydraulic cylinder 56 is operatively connected to the elevator frame through a plurality of cables 57 (FIG. 1) that extend from the hydraulic cylinder over pulleys 58 for supporting and moving the elevator frame vertically from several points to provide a uniform movement of the frame 28 at both sides 18 and 20.

Figure 9:
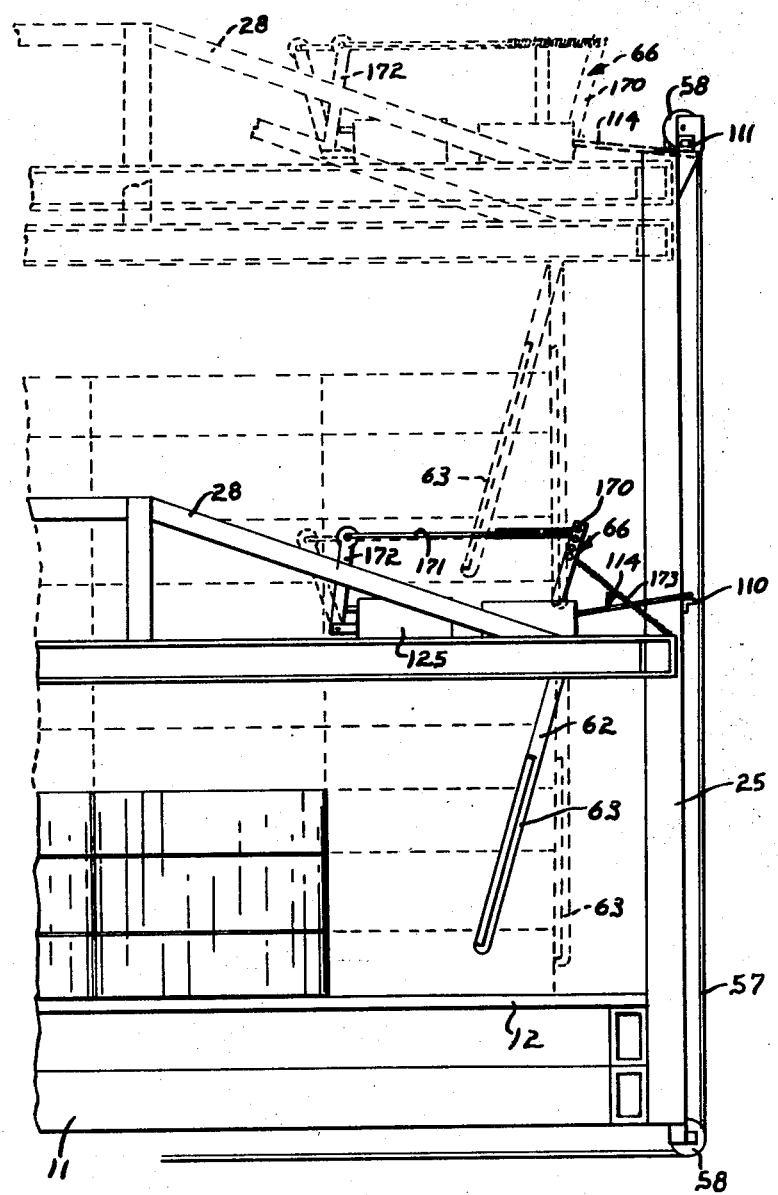
FIG. 9 is a vertical cross-sectional view taken along line 9—9 in FIG. 2 showing a sensing means for sensing when a row of hay bales has been formed on the bed with a sequence position of the sensing means illustrated in dotted lines.

A sensing means 62 (FIG. 9) is mounted on the elevator frame 23 adjacent the side 20 for sensing when a transverse row has been formed on the bed at the stacking and unstacking station 22. The sensing means 62 includes an arm frame 63 that is pivotally mounted on the elevator frame 28 and extended downward into the path of the row to sense when the desired number of hay bales have been pushed across the bed to form a transverse row. A control means 66 is operatively connected between the sensing means 62 and the elevator drive for raising the elevator frame 28 one layer at a time to position the platform 30 adjacent the top of the layer that has been formed to enable an additional layer of bales to be added to the row.

The control means 66 includes two stationary abutment arms 110 and 111 (FIG. 9) mounted at vertically spaced locations on the upright 25 adjacent the side 20.

The control means 66 further includes a trip lever 114 mounted on the elevator frame 29 that engages the abutment arms 110 and 111. When the trip lever 114 engages the arms 111 the control means 66 is operated to stop further upward movement of the elevator frame. When the trip lever 114 engages arm 110 the control means 66 is operated to stop further downward movement of the elevator frame 28. In this embodiment, the vehicle is designed to form a row three layers high before lever 114 engages arm 111.

The hay bale vehicle 10 has a bed conveyor 68 (FIG. 1 and 2) that includes transversely spaced continuous chains 70 that are movably mounted on the bed. Transverse bars 71 extend between the space chains for engaging hay bale rows and moving the rows longitudinally. The conveyor 68 includes a reversible drive means 72 for moving the chains in either longitudinal direction to move the rows to and from the stacking and unstacking station 22. The drive 72 includes a reversible hydraulic motor 73.

A tail gate is pivotally affixed to the bed 12 along the rear end 17. The tail gate 75 is biased upward as shown in FIG. 1 by a spring 76. The hay bale vehicle has means 78 (FIG. 1 and 2) for lowering the bed, particularly the rear end to facilitate the movement of a stack of hay bales fro the tail end of the vehicle. The means 78 includes a shaft 80 that extends between the sides 18 underneath the bed 12. Heavy duty brackets 81 are affixed to the ends of the shaft 80 and extend out radially with axle studs 82 affixed on the brackets 81 offset from the shaft 80 as shown in FIG. 1. The wheels 14 are rotatably mounted on the axle studs 82. The means 78 further includes an arm 87 formed integrally with the bracket 81 on side 18 that extends outwardly therefrom. A hydraulic cylinder 85 is mounted on the frame 11 and connected to arm 84. The axle studs 82 are offset from the shaft 80 so that when the cylinder is operated and axle studs are pivoted about the shaft 80 to raise and lower the bed with respect to the wheels. This enables the rear end 18 of the bed to be lowered to the ground to facilitate the discharge of one or more rows of bales or the entire stack from the rear end of the vehicle.

The hay bale vehicle 10 has an unloading mechanism 88 (FIG. 2) which is utilized in conjunction with the elevator mechanism and the bed conveyor 68 for unloading the bales one at a time from the vehicle. The unloading mechanism 88 includes a frame 89 slidably mounted on the elevator frame 28 for transverse movement from the side 20 toward the platform 30. The sliding frame has depending arms 90 that extend downward for engaging an end bale of a layer. The sliding frame 89 is driven to and from the platform 30 by a hydraulic cylinder 92 that is mounted on the elevator frame 28. Two pulleys 94 and 95 are mounted on the end of a cylinder rod of the hydraulic cylinder 92. Separate cables 96 and 97 extend over the pulleys 94 and 95 respectively. Cable 96 has one end 98 affixed to the elevator frame and the other end 100 affixed to the front of the sliding frame 89. The return cable 97 has one end 103 affixed to the elevator frame 28. The cable 97 extends over pullies 95, 105 and 106 with the other end 104 affixed to the rear of the sliding frame 89. When the rod of the hydraulic cylinder 92 is extended the cables cause the sliding frame 89 to move from the side 20 towards the platform 30 to move a layer of hay bales toward the platform 30. It should be noted that the sliding frame 89 moves twice the distance as the piston rod of the cylinder 92.

In discussing the operation of the hay bale vehicle 10 reference will be made to the hydraulic schematic shown in FIG. 13. Hydraulic fluid is fed under pressure to the hydraulic system through a feed line 117. The fluid passes through a manually operated three-position valve 118. When the three-position valve 118 is in a neutral position the fluid flows to a manually operated three-position valve 120. When the three-position valve 120 is in a neutral position the fluid flows to a manually operated three-position valve 121. Likewise, when the three-position valve 121 is in a neutral position in the fluid flows to a two-position valve 123. When the two-position valve is in the position shown in FIG. 13, the fluid flows to a three-position valve 124. Valve 124 is part of the control means 53 for controlling the fluid to cylinder 50. When the three-position valve 124 is in a neutral position the fluid flows to a two-position valve 125 Valve 125 is part of the control means 62. When the two position valve 125 is in the position shown in FIG. 13, the fluid flows to a manually operated two-position valve 126 to control the direction of rotation of the hydraulic motor 73.

To begin the operation, the vehicle is transported over a field to present the bale pickup mechanism 31 with the reference guides 34 aligned with a bale in the field. When the bale enters between the entrance guides 34 the hydraulic motor 42 drives the chain conveyor 45 to pick the bale from the ground and direct the bale longitudinally to the platform conveyor 40. When the bale is positioned in the platform 30 the sensing means 52 is operated to energize the three-position valve 124 to direct fluid pressure to the hydraulic cylinder 50 to extend the cylinder rod. When this occurs, the hydraulic cylinder 50 moves the pusher arms 47 across the platform 30 to push the hay bale sidewards from the platform 30 onto the bed 12. When the bale is pushed from the platform 30 the control means 53 operates the three-position valve 124 to retract the piston rod of the hydraulic cylinder to pull the pusher arms 47 back across the platform to their original position.

It should be noted that when the valve 124 moves from its neutral position the flow of fluid to the motor 42 is discontinued to stop the movement of the conveyors 35 and 40. When the transverse pusher 44 is fully retracted, the hydraulic motor 42 is automatically started to move a successive hay bale onto the platform 30. This cycle is continued until a lower level of a transverse row is formed. When the last bale of a layer pushed onto the bed, the first bale engages and pivots arm frame 63 to cause the control means 66 to operate valve 125 to direct the fluid through a two-position valve 128 to elevator cylinder 56 to raise the elevator frame 28 to a second layer position. As the frame 28 is moving upward the motor 42 is stopped. When the arm frame 63 clears the lower layer, the arm frame 63 swings outward to operate the valve 125 back to the position shown in FIG. 13 to initiate the formation of a second layer of bales of the row.

After the second layer is added, the row sensing means 62 is operated to cause the hydraulic cylinder 56 to drive the elevator frame 28 upward to a third or top layer position. After the third layer has been added to form a full transverse row, the hydraulic cylinder 56 is actuated to lift the elevator frame 28 a slight distance to direct the trip lever 114 against the abutment arm 111. When this occurs the control means 63 operates valve 128 to hold the cylinder 56 in a frozen position. The valve 118 is then operated manually to direct the fluid to the motor 73 to move the conveyor 63 and transport the formed row rearward on the bed to enable a subsequent row to be formed.

When the bales are moved from the stacking and unstacking station 22, the arm frame 63 pivots outward to reposition the two-position valves 125 and 128 in their positions shown in FIG. 13 and to also position a two-position drain valve 130 in the alternate position from the one shown in FIG. 13 to allow the hydraulic pressure in the cylinder 56 to drain and permit the elevator mechanism to descend by gravity. When the elevator frame 28 approaches the bed the trip lever 114 engages the abutment arm 110 to operate the valve 130 to prevent further draining and downward movement of the elevator mechanism. This process is repeated until the desired number of rows are formed on the hay bale vehicle.

After a stack is formed the vehicle is transported to a storage location for unloading. If it is desired to unload the entire stack then the three-position valve 120 and a two-position valve 131 are operated to supply fluid pressure to the hydraulic cylinder 85 to lower the rear end of the bed. After this occurs, the valve 118 is operated to direct fluid pressure to the hydraulic motor 73 to operate the bed conveyor to move the stack off the tail end of the vehicle and onto the ground.

Figure 8:
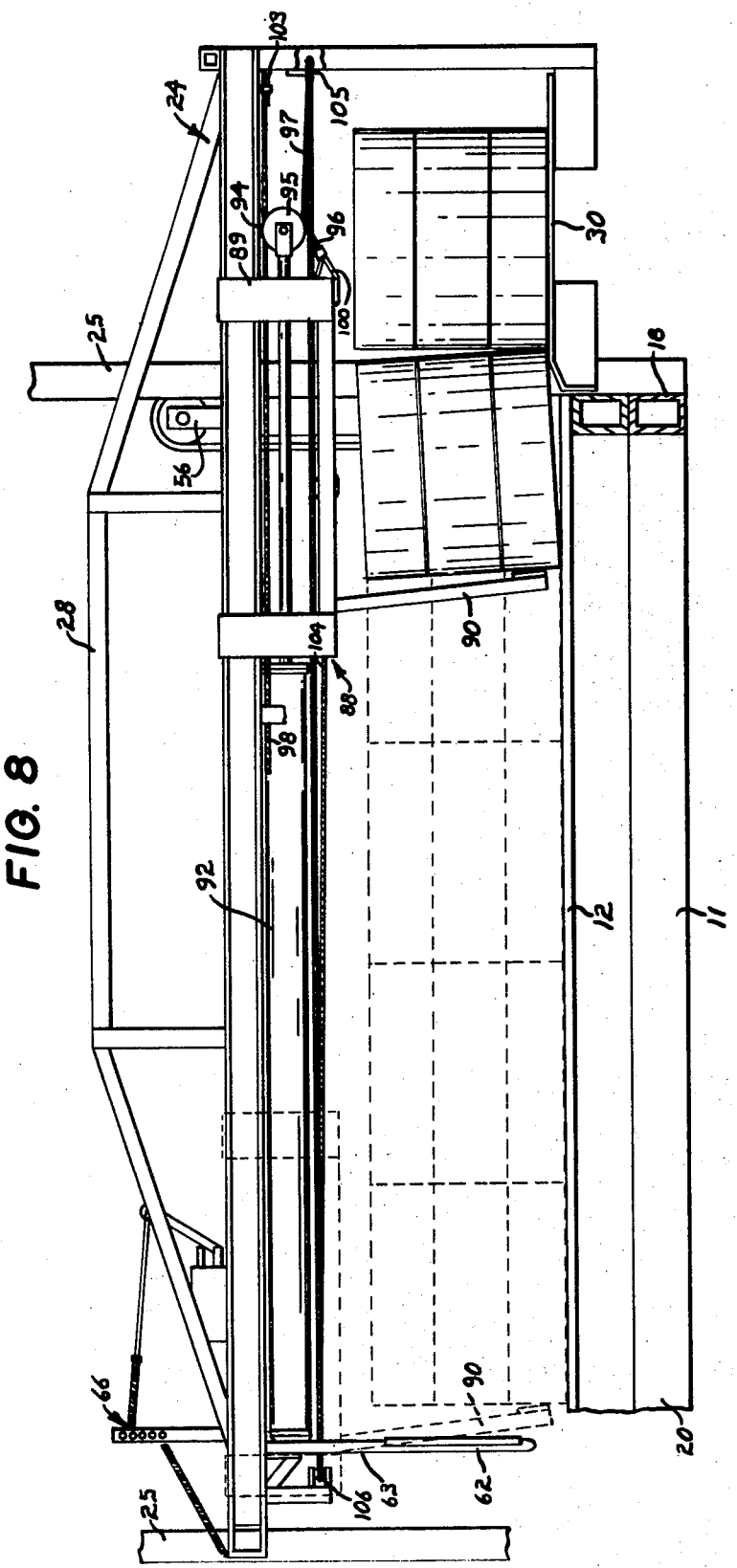
FIG. 8 is a vertical cross-sectional view taken along line 8—8 in FIG. 2 showing an unloading mechanism for unloading hay bales from the vehicle.

Frequently it is desirable to unload the hay bales one at a time from the vehicle onto a hay stack conveyor. To begin with, preliminary procedures are followed to lock the arm frame 63 in the position shown in FIG. 8. Three-position valve 121 and a two-position valve 132 are operated to direct pressure to a hydraulic cylinder 133 (FIG. 2 and 13) to lift the front of the conveyor 35 to a select elevation adjacent the conveyor at the hay stack. To begin the unloading, valve 118 is then operated to direct the fluid to the hydraulic motor 73 to push the stack forward to direct the front row into the stacking and unstacking station 22. Valve 120 and valve 131 are then intermittently manually operated to apply fluid pressure to the hydraulic cylinder 92 to incrementally extend the piston rod to drive the sliding frame 89 towards the platform 30 as shown in FIG. 8. When this occurs, the arm 80 engages the upper layer of the front row and directs the hay bales successively onto the platform 30. When a hay bale is located on the platform 30, the valve 120 is moved to the neutral position and the valve 126 is moved to the alternate position to drive the hydraulic motor 42 in the opposite direction to move the hay bale down the conveyor 35 and discharge hay bale from the vehicle at the selected level onto the hay stack conveyor. After the last bale in the layer is pushed on the platform the three-position valve 130 is directed in the opposite direction to move the sliding frame 89 back to its original position. Fluid pressure against the hydraulic cylinder 56 is released by manually operating valve 130 to allow the elevator mechanism to descend to the next layer. The bales from the second layer are then moved successively onto the platform and down the conveyor 35. This procedure is continued until all or the desired number of the bales are removed from the bed.

In additional detail, the control means 53 includes a pivotally mounted lever 140 (FIGS. 5–7) having one end connected to the sensing means 52 and the other end connected to the three-position valve 124. The lever 140 pivots about point 143. Control means 53 has two opposing hooks 146 and 148 overlapping the lever 140 to control the pivotal movement of the lever 140 in either direction from its neutral position. Hooks 146 and 148 pivot about spaced pins 147 and 150 respectively. Each hook 146 and 148 has a nose 151 that rides on the lever 140 when the lever 140 is in the neutral or central position. A spring 152 interconnects the hooks 146 and 148 to bias the hooks in opposite directions as shown in FIGS. 6 and 7.

The control means 53 also includes a control rod 153 affixed to and carried by the sliding frame 46 that moves in response to the operation of the hydraulic cylinder 50. A lost motion rod 154 is slidably mounted on the elevator frame 28 parallel with the rod 153. Control rod 153 has abutments 155 and 156 mounted thereon at spaced locations. Lost motion rod 154 has a bracket 157 affixed thereon that extends therefrom that is engaged by the abutments 155 and 156 when the control rod 153 has moved a prescribed distance to move the rod 154 upon further movement by the rod 153. Abutments 160 and 161 are affixed on the rod 154 in alignment with the hooks 146 and 148 respectively for engaging the respective hooks and pivoting and hooks in the opposite directions to the spring bias to release the lever 140. A rubber band 164 connects the lever 140 with the bracket 157.

Figure 5:
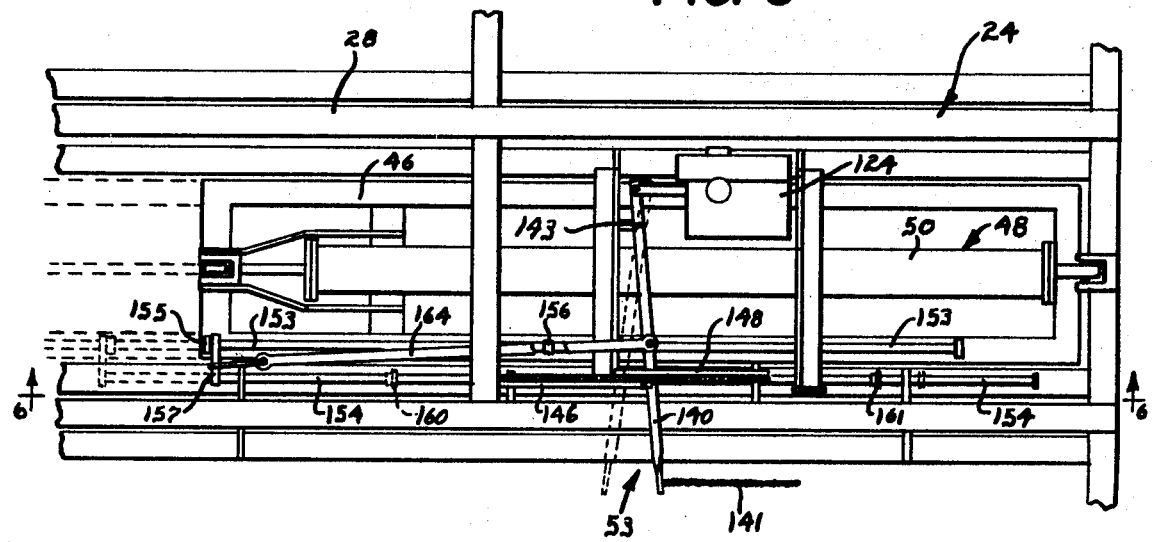
FIG. 5 is a fragmentary enlarged view of a control system for operating a pusher mechanism for pushing hay bales from the elevator mechanism onto a bed of the vehicle.
Figure 6:
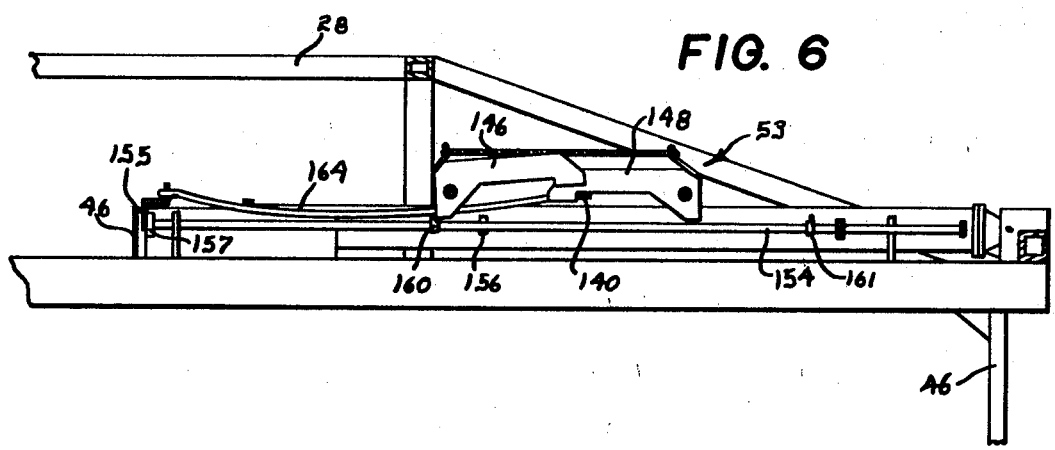
FIG 6 is a vertical cross-sectional view taken along line 6—6 in FIG. 5 showing the control system when the pusher mechanism is retracted.
Figure 7:
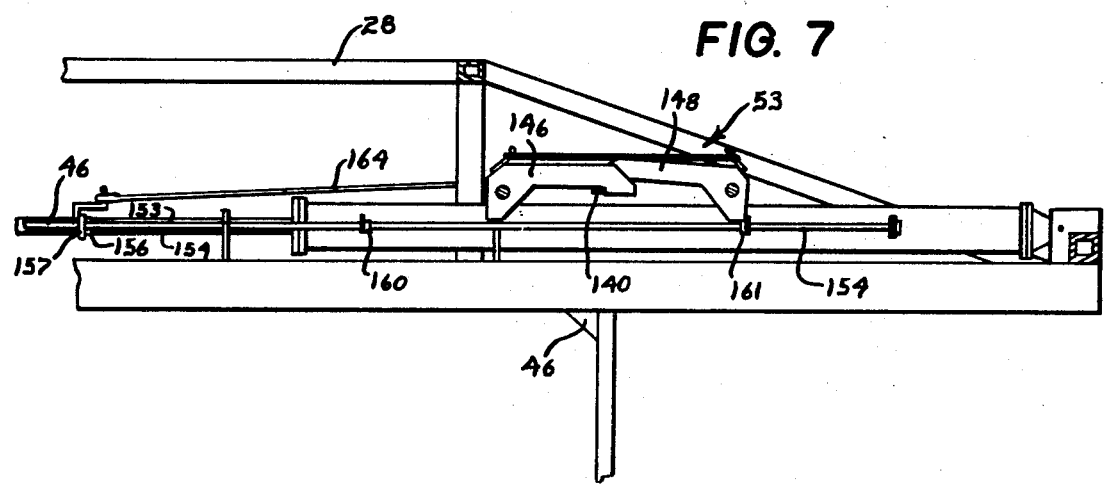
FIG. 7 is a vertical cross-sectional view similar to FIG. 6 except showing the control system when the pusher mechanism is extended.

In operation, the lever 140 is pulled to the right as shown in FIG. 5–7 when the sensing means 52 is operated to lock the lever 140 in the hook 148 (FIG. 6). This moves the lever from the neutral position to operate the valve 124 to direct hydraulic fluid to the cylinder 50 to drive the frame 46 to the left. After a certain distance is traveled the abutment 156 engages the bracket 157 and moves the rod 154 to the left. Movement of the rod 154 to the left stretches the rubber band 164. When the cylinder 50 reaches the end of the stroke, the abutment 161 engages the hook 148 and pivots the hook upward to release the lever 140. Because of the rubber band tension, the lever 140 quickly moves to the left position to reverse the flow to the cylinder 50. When the lever 140 moves to the left the hook 146 receives the lever 140 and holds the lever in the left position as shown in FIG. 7. The reversal of the fluid flow causes the cylinder to retract and pull the frame 46 back. After a certain distance of travel, abutment 155 engages bracket 157 and slides the rod 154 to the right. When the cylinder 50 is fully retracted abutment 160 engages the hook 146 and pivots the hook upward to release the lever 140 and allow the lever 140 to move to the neutral position.

In more detail, the control means 66 (FIG. 9) includes an arm 170 connected to the arm frame 63 that extends upward. A rod 171 connects the arm 170 with a lever 172 for operating valve 125. When a bale engages the arm frame 63, the arm 170 is pivoted to shift the valve 125 to raise the elevator frame 28.

Figure 10:
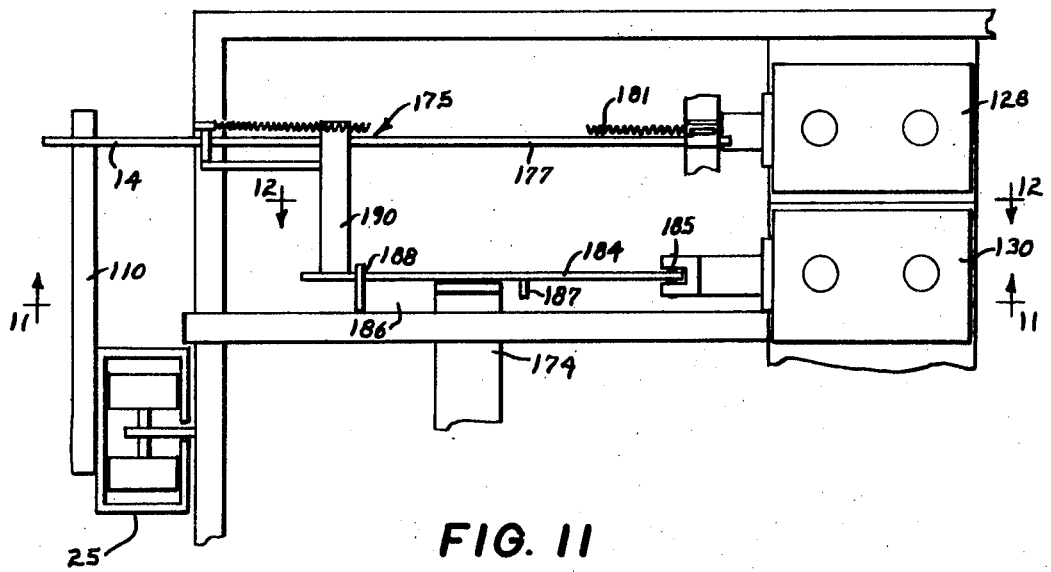
FIG. 10 is a fragmentary isolated plan view of a control means for operating the unloading mechanism.
Figure 11:
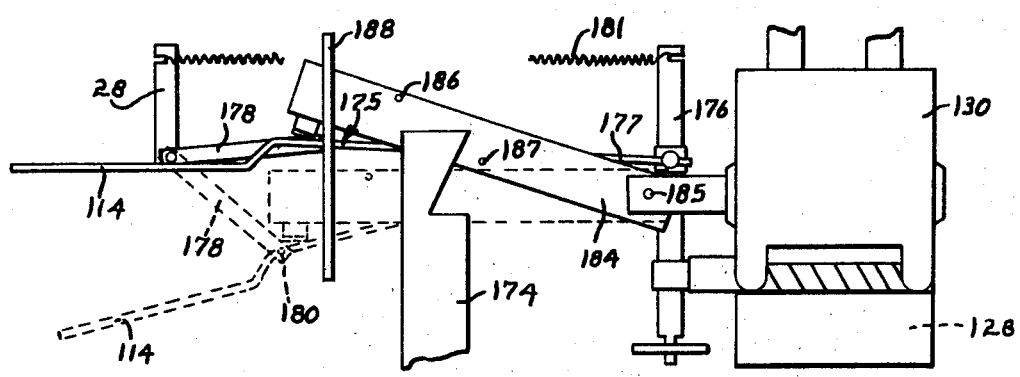
FIG. 11 is a vertical cross-sectional view taken along line 11—11 in FIG. 10.
Figure 12:
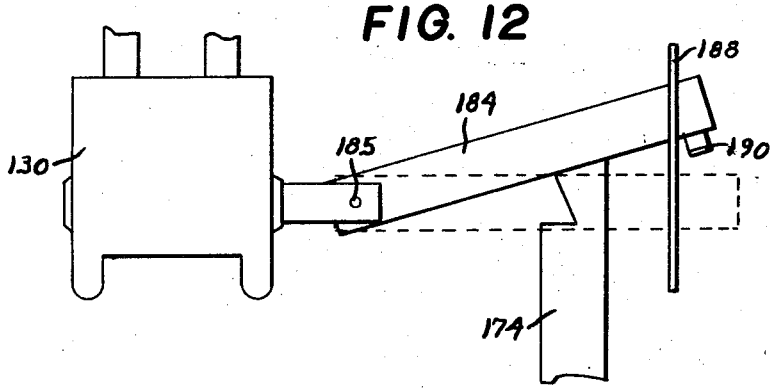
FIG. 12 is a vertical cross-sectional view taken along line 12—12 in FIG. 10.

The control means 66 further includes an over center toggle arrangement 175 (FIGS. 10–12) for operating valve 128 in response to the trip lever 114. Such an arrangement 175 includes a lever 176 connected to the valve 128. Two pivotally connected arms 177 and 178 interconnect the lever 176 and the frame 28. The trip lever 114 is affixed to the arm 177 to operate the toggle arrangement 175. A spring 181 interconnects the lever 176 and the frame to cause the arrangement 175 to flip from one position to another when the arrangement is moved over the center by the trip lever 114.

The control means 66 further includes a lever 184 that is pivotally connected at point 185 to the spool of valve 130. The forward end of lever 184 is slidably mounted for vertical movement in a guide 188. Spaced pins 186 and 187 are affixed to the lever 184 at spaced longitudinal and vertical locations. The arm frame 63 has an upper end 174 that extends upward terminating alongside the lever 184 for engaging the pins 186 and 187 to push or pull the lever 184 to operate the valve 130. A cross arm is affixed to the lever 184 and extends outward to the side of the lever 184 resting on the toggle arrangement 175. When the elevator frame 28 is in the down position the trip lever 114 is pushed upward to present the toggle arrangement in an up position shown in solid lines in FIG. 11. In this position, the lever 184 is pivoted upward sufficiently so that the end 174 will clear the pin 186 when the arm frame 63 is pivoted. However, when the trip lever 114 engages the abutment arm 111, the toggle arrangement 175 is flipped downward to lower the lever 184 to present the pin 186 in the path of the end to operate the valve 130 when the arm frame 63 pivots outward. Thus, when the trip lever 114 engages the abutment arm 111, valve 128 is operated to prevent further upward movement of the elevator frame. After a row of bales is moved rearward, the arm frame 63 is released to swing outward pivoting the end 174 against the pin 186 to pull the lever 184 and operate valve 130. The operation of valve 130 drains the fluid from the elevator cylinder to lower the elevator frame 28. When the end pivots in the opposite direction, it engages pin 187 and pushes the lever rearward to reposition the valve in the position shown in FIG. 13.

It should be appreciated that the above described embodiment is simply illustrative of the principles of the invention and numerous other embodiments may be readily devised by those skilled in the art without deviating from the principles thereof. Therefore, only the following claims are intended to define this invention.

What is claimed is:

1. A hay bale vehicle for transporting a plurality of hay bales stacked in a plurality of transverse rows several layers high to a storage facility and unloading the hay bales from the vehicle, comprising:
   a. a mobile frame having a bed with transversely spaced sides and longitudinally spaced ends for receiving the supporting the stacked hay bales;
   b. a conveyor means mounted on the frame for moving the stacked bales longitudinally to present a transverse row to an unstacking station;
   c. an elevator mechanism mounted on the frame at the unstacking station for vertical movement, said elevator mechanism having a platform adjacent one side of the bed at the stacking station;

d. a transverse pushing means mounted on the elevator mechanism initially adjacent the other side of the bed for vertical movement with the platform and for horizontal movement toward the platform to engage a layer of bales of the transverse row located at the stacking station and move the layer of bales across the bed successively positioning the bales on the platform;

e. a drive means for incrementally moving the elevator downward to sequentially position the platform and transverse pushing means adjacent the several layers; and f. discharge means mounted on the frame for removing the bales from the platform and discharging the bales one at a time from the vehicle at a desired elevation independently of the initial position of the platform.

2. A hay bale vehicle as defined in claim 1 wherein the transverse pushing means has a drive means for incrementally moving the engaged layer toward the platform to deposit one bale at a time thereon and wherein the discharge means includes a conveying means for removing the bales from the platform and delivering the bales to the desired discharge elevation independently of the vertical position of the platform.

3. A hay bale vehicle as defined in claim 1 comprising means for lowering at least one end of the bed and wherein the conveying means for moving the stacked bales is capable of being operated to move the stacked bales as a unit off the lowered end of the bed.

4. A hay bale vehicle as defined in claim 1 further comprising:

means for loading hay bales one at a time onto the vehicle and forming the hay stack on the bed, said loading means including a hay bale pickup means for picking up bales one at a time from a field and successfully delivering the bales to the platform;

a second transverse pushing means mounted on the elevator mechanism adjacent the platform for engaging the bales on the platform and moving the bales from the platform to form a transverse row of bales across the bed; and a conveyor means mounted on the frame for moving a formed transverse row of bales longitudinally on the bed to enable subsequent transverse rows to be formed.

* * * * *